(12) United States Patent
Martinez et al.

(10) Patent No.: US 11,677,504 B2
(45) Date of Patent: Jun. 13, 2023

(54) WIRELESS COMMUNICATION WITH REPETITION DETECTION

(71) Applicant: NXP B.V., Eindhoven (NL)

(72) Inventors: Vincent Pierre Martinez, Roques (FR); Artur Tadeusz Burchard, Eindhoven (NL); Alessio Filippi, Eindhoven (NL)

(73) Assignee: NXP B.V., Eindhoven (NL)

( * ) Notice: Subject to any disclaimer, the term of this patent is extended or adjusted under 35 U.S.C. 154(b) by 11 days.

(21) Appl. No.: 17/006,998

(22) Filed: Aug. 31, 2020

(65) Prior Publication Data

US 2021/0091889 A1    Mar. 25, 2021

(30) Foreign Application Priority Data

Sep. 23, 2019  (EP) .................................... 19306173

(51) Int. Cl.
*H04L 1/08* (2006.01)
*H04L 1/00* (2006.01)
(Continued)

(52) U.S. Cl.
CPC ................ *H04L 1/08* (2013.01); *H04L 1/008* (2013.01); *H04L 5/0044* (2013.01);
(Continued)

(58) Field of Classification Search
CPC ......... H04L 1/08; H04L 1/008; H04L 5/0044; H04L 5/0094; H04L 69/22; H04L 1/208; H04L 1/1829; H04W 4/40
See application file for complete search history.

(56) References Cited

U.S. PATENT DOCUMENTS

| 8,027,402 B2 | 9/2011 | Lee et al. |
| 8,121,209 B2 | 2/2012 | Lee et al. |

(Continued)

FOREIGN PATENT DOCUMENTS

| EP | 3282591 A1 | 2/2018 |
| EP | 3282618 A1 | 2/2018 |
| WO | 0054437 A2 | 9/2000 |

OTHER PUBLICATIONS

Fischer, M., "Adaptive Repetition Scheme for NGV", 802.11-19/0784r0, May 2019.

(Continued)

*Primary Examiner* — Ajit Patel
*Assistant Examiner* — Wilfred Thomas

(57) ABSTRACT

Aspects of the present disclosure are directed to use with communications that may involve repetitive communications. As may be implemented in accordance with one or more embodiments, a subset of symbols in a current data message (130/131) are used with a corresponding subset of symbols in a previous data message (120/121), to ascertain whether the current data message is a repetition of the previous data message. This may involve, for instance, generating a resemblance metric to represent semblance between a subset the data symbols of the current data message and a subset the data symbols of the previous data message (102). The resemblance metric can be used in determining whether the current data message is a repetition of the previous data message. This approach may be useful, for example, in ascertaining whether the current message is a repetition without necessarily decoding the message.

16 Claims, 6 Drawing Sheets

(51) Int. Cl.
*H04L 5/00* (2006.01)
*H04L 69/22* (2022.01)
*H04W 4/40* (2018.01)

(52) U.S. Cl.
CPC ............ *H04L 5/0094* (2013.01); *H04L 69/22* (2013.01); *H04W 4/40* (2018.02)

(56) References Cited

U.S. PATENT DOCUMENTS

| | | | |
|---|---|---|---|
| 2003/0050720 A1* | 3/2003 | Kolessar | H04L 63/1408 381/56 |
| 2003/0112780 A1 | 6/2003 | Ouyang et al. | |
| 2006/0133281 A1 | 6/2006 | Witherell et al. | |
| 2007/0250751 A1* | 10/2007 | Cai | H04L 1/008 714/748 |
| 2008/0025427 A1* | 1/2008 | Lee | H04L 1/1845 375/262 |
| 2008/0247355 A1 | 10/2008 | Ahn | |
| 2009/0238289 A1* | 9/2009 | Sampath | H04L 25/0224 375/260 |
| 2014/0269605 A1* | 9/2014 | Pecen | H04L 27/2678 370/330 |
| 2017/0237632 A1* | 8/2017 | Hegde | H04L 43/12 370/252 |
| 2020/0044789 A1* | 2/2020 | Beale | H04W 72/042 |
| 2020/0053706 A1 | 2/2020 | Sadeghi et al. | |
| 2020/0132829 A1 | 4/2020 | Jiang et al. | |
| 2020/0335183 A1* | 10/2020 | Tommasi | G06N 20/00 |
| 2021/0006449 A1* | 1/2021 | Zhibo | H04L 27/2675 |
| 2021/0076356 A1 | 3/2021 | Zhang et al. | |
| 2021/0091889 A1 | 3/2021 | Martinez et al. | |
| 2021/0211242 A1* | 7/2021 | Andgart | H04L 1/1864 |
| 2021/0266910 A1* | 8/2021 | Yliuntinen | H04W 72/0446 |
| 2021/0328716 A1* | 10/2021 | Noh | H04W 4/46 |
| 2022/0255693 A1 | 8/2022 | Lou et al. | |

OTHER PUBLICATIONS

U.S. Appl. No. 17/006,982, filed Aug. 31, 2020, entitled "Wireless Communication With Timedelay Repetition Detection".
Notice of Allowance for U.S. Appl. No. 17/006,982, received Sep. 22, 2022.

* cited by examiner

WIRELESS COMMUNICATION WITH REPETITION DETECTION

CROSS-REFERENCE TO RELATED APPLICATIONS

This application claims the priority under 35 U.S.C. § 119 of European Patent application no. 19306173.6, filed on 23 Sep. 2019, the contents of which are incorporated by reference herein.

OVERVIEW

Aspects of various embodiments are directed to apparatuses and methods for assessing communications for repetition based on semblance between respective data symbols of data messages.

Wireless communications are used to pass information between transmitters and receivers. For instance, transmissions involving vehicle-to-everything (V2X) communications involve transmission and reception between a vehicle and another entity, and vice versa. As vehicles (e.g., stations) employing V2X can utilize different standards of communication, with a mix of vehicles using older and newer standards operating in the same band and/or channel, ensuring compatibility can be important. For instance, new standards messages may re-use the same structure (e.g., preamble followed by data section) than the older standard messages, even though sent at a different transmit rate or repeated multiple times. Therefore, some messages are new, whereas others may be repetitions of a previous message. Further, while V2X communications have been useful, it can be challenging to ensure that transmissions are accurate and efficient.

These and other matters have presented challenges to efficiencies of wireless vehicular communications implementations, for a variety of applications.

SUMMARY

Various example embodiments are directed to issues such as those addressed above and/or others which may become apparent from the following disclosure concerning repetitive communications, and to determining whether communications are a repetition of a previous communication. Various such approaches involve making such a determination using a subset of received symbols, relative to a subset of symbols in the previous communication. In certain example embodiments, aspects of the present disclosure involve determining a resemblance metric in subsets of symbols in received communication, and determining whether the communications are repetitive based on the resemblance metric. These approaches may facilitate rapid identification of an incoming packet and reduce the need for resources, such as buffer size and computing resources.

As may be implemented in accordance with a more specific embodiment, a method is carried out as follows. Wireless data transmissions are received via communications circuitry, and include subsequently-communicated data messages having a current data message and a previous data message that are received in succession among the subsequently-communicated data messages. Each of the subsequently-communicated data messages are configured, according to a communications protocol, for asynchronous wireless reception and with respective data messages and with respective data symbols. A resemblance metric is generated to, for the current and previous data messages, represent semblance between a subset the data symbols of the current data message and a subset the data symbols of the previous data message. In response, whether the current data message is a repetition of the previous data message is determined based on the resemblance metric.

Another embodiment is directed to an apparatus including a wireless communications receiver and a decoding circuit. The wireless communications receiver receives communications, including subsequently-communicated wireless data messages having a current data message and a previous data message received in succession among the subsequently-communicated data messages. Each of the subsequently-communicated data messages is configured according to a communications protocol, for asynchronous wireless reception and with respective data messages and with respective data symbols. The decoding circuit is configured to generate a resemblance metric for the current and previous data messages, which represents semblance between a subset the data symbols of the current data message and a subset the data symbols of the previous data message. The decoding circuit is further configured to, in response, determine whether the current data message is a repetition of the previous data message based on the resemblance metric.

Aspects of the disclosure are defined in the accompanying claims.

In a first aspect, there is provided a method comprising: receiving a wireless data transmission, via communications circuitry, subsequently-communicated data messages including a current data message and a previous data message received in succession among the subsequently-communicated data messages, each of the subsequently-communicated data messages being configured, according to a communications protocol, for asynchronous wireless reception and with respective data messages and with respective data symbols; and for the current and previous data messages, generating a resemblance metric to represent semblance between a subset the data symbols of the current data message and a subset the data symbols of the previous data message; and in response, determining whether the current data message is a repetition of the previous data message based on the resemblance metric.

In one or more embodiments, generating the resemblance metric may include comparing a subset of data payload symbols in the current data message with a corresponding subset of data payload symbols in the previous data message; and determining that the current data message may be a repetition of the previous data message includes determining that the current data message is a repetition in response to the resemblance metric indicating that a majority of the subset of symbols in the current data message match the subset of symbols in the previous data message.

In one or more embodiments, generating the resemblance metric may include generating the resemblance metric based on subsets of symbols in the previous and current data messages, prior to decoding the subset of symbols in the current data message.

In one or more embodiments, generating the resemblance metric based on subsets of symbols in the previous and current data messages, prior to decoding the subset of symbols in the current data message, may include: initiating a decoding process for the subset of symbols in the current data message; and generating the resemblance metric using the symbols at a stage in the decoding process that is prior to completing decoding of the subset of symbols, and using the symbols of the previous data message at the corresponding stage of decoding.

In one or more embodiments, determining whether the current data message is a repetition of the previous data message may include: comparing a symbol in a header of the current data message with a corresponding symbol in the previous data message; and determining that the current data message is not a repetition of the previous data message in response to the symbol in the header of the current data message failing to match the corresponding symbol in the previous data message.

In one or more embodiments, the steps of generating the resemblance metric and determining whether the current data message is a repetition of the previous data message may be carried out in response to the symbol in the header of the current data message matching the corresponding symbol in the previous data message.

In one or more embodiments, the subsets of the data symbols may include a subset of data symbols in a preamble, in a payload, or in a combination of preamble and payload, of the current and previous data messages.

In one or more embodiments, the method may further include checking a cyclic redundancy check (CRC) status of the previous data message, wherein the steps of generating the resemblance metric and determining whether the current data message is a repetition of the previous data message may be carried out in response to the CRC status indicating that the previous data message was not decoded correctly.

In one or more embodiments, the method may further include: checking a cyclic redundancy check (CRC) status of the previous data message; in response to the CRC status of the previous data message indicating that the previous data message was not decoded correctly, comparing a symbol in a header of the current data message with a corresponding symbol in the previous data message, wherein the steps of generating the resemblance metric and determining whether the current data message is a repetition of the previous data message are carried out in response to the compared header symbols matching.

In one or more embodiments, the method may further include decoding the entire current message in response to one of: the CRC status indicating that the previous data message was decoded correctly; and the compared header symbols not matching.

In a second aspect, there is provided an apparatus comprising: a wireless communications receiver to receive subsequently-communicated wireless data messages including a current data message and a previous data message received in succession among the subsequently-communicated data messages, each of the subsequently-communicated data messages being configured according to a communications protocol, for asynchronous wireless reception and with respective data messages and with respective data symbols; and a decoding circuit configured to, for the current and previous data messages, generate a resemblance metric to represent semblance between a subset the data symbols of the current data message and a subset the data symbols of the previous data message, and, in response, determine whether the current data message is a repetition of the previous data message based on the resemblance metric.

In one or more embodiments, the decoding circuit may be configured to: generate the resemblance metric by comparing a subset of data payload symbols in the current data message with a corresponding subset of data payload symbols in the previous data message; and determine that the current data message is a repetition of the previous data message in response to the resemblance metric indicating that a majority of the subset of symbols in the current data message match the subset of symbols in the previous data message.

In one or more embodiments, the decoding circuit may be configured to generate the resemblance metric based on subsets of symbols in the previous and current data messages, prior to decoding the subset of symbols in the current data message, by: initiating a decoding process for the subset of symbols in the current data message, generating the resemblance metric using the symbols at a stage in the decoding process that is prior to completing decoding of the subset of symbols in the current message, and using the symbols of the previous data message at the corresponding stage in the decoding process.

In one or more embodiments, the decoding circuit may be configured to: compare a symbol in a header of the current data message with a corresponding symbol in the previous data message; and in response to the symbol in the header of the current data message not matching the corresponding symbol in the header in the previous data message, determining that the current data message is not a repetition of the previous data message, and decoding the current data message; generate the resemblance metric in response to the symbol in the header of the current data message matching the corresponding symbol in the previous data message.

In one or more embodiments, the decoding circuit may be configured to: check a cyclic redundancy check (CRC) status of the previous data message; in response to the CRC status of the previous data message indicating that the previous data message was not decoded correctly, compare a symbol in a header of the current data message with a corresponding symbol in the previous data message; and carry out the functions of generating the resemblance metric and determining whether the current data message is a repetition of the previous data message in response to the compared header symbols matching.

In a third aspect, there is provided a method comprising: receiving current and previous data packets over a channel on which wireless communications are transmitted for asynchronous reception according to a communications protocol; and generating a resemblance metric based on a subset of symbols in the current data packet and a corresponding subset of symbols in the previous data packet, the resemblance metric providing an indication of semblance between the subsets of symbols in the current and previous data packets; determining whether the current data packet is a repetition of the previous data packet based on the resemblance metric.

In one or more embodiments, the subsets of symbols in the current and previous data packet may include one or both of data payload symbols and packet preamble symbols.

In one or more embodiments, generating the resemblance metric may include using the subsets of symbols prior to decoding.

In one or more embodiments, the method may further include: checking a cyclic redundancy check (CRC) status of the previous data message; in response to the CRC status of the previous data message indicating that the previous data message was not decoded correctly, comparing a symbol in a header of the current data message with a corresponding symbol in the previous data message, wherein generating the resemblance metric is carried out in response to the comparing indicating that the symbols in the headers of the current and previous data messages match.

In one or more embodiments, the method may further include, in response to the determining indicating that the current data packet is a repetition of the previous data packet, decoding the current data packet and combining data from the current data packet and the previous data packet.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
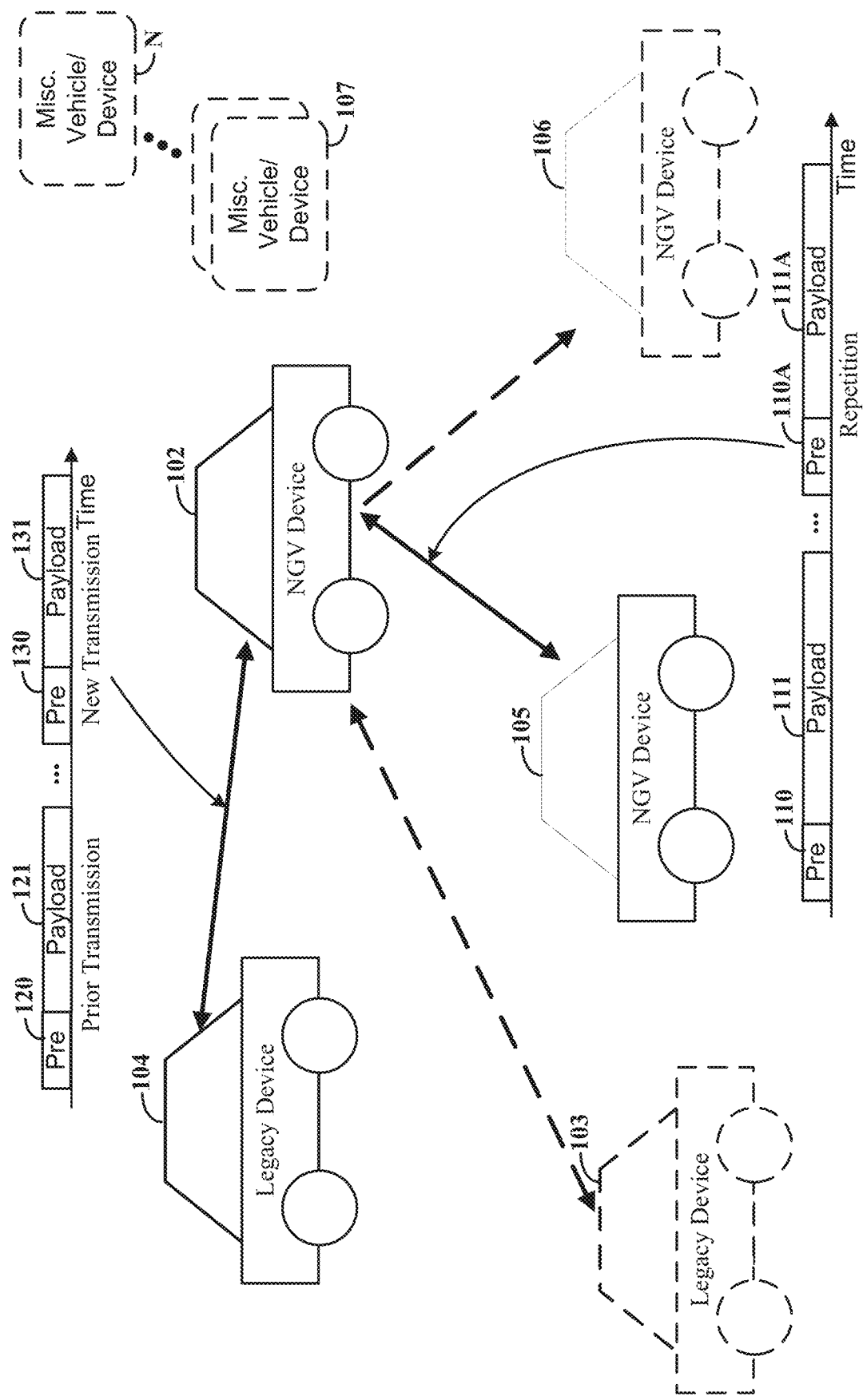
FIG. 1 illustrates an example communications system and approach, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving ascertaining the presence of repetitive communications, such as repetitions. Identifying a communication as being repetitive may facilitate efficient processing while ensuring processing of new communications. In certain implementations, aspects of the present disclosure have been shown to be beneficial when used in the context of V2X communications, and in the context of communication environments in which different communication protocols are used. For instance, when protocols evolve, a new protocol may need to operate in a manner that allows older (e.g., legacy) communications and related circuitry to continue to be used, such as for situations in which a new protocol may implement repetitions where an older protocol does not. Accordingly, new protocol stations may retransmit a packet, which is encoded as per the legacy standard. The legacy stations may be able to decode each repetition standalone, while new-protocol stations may do advanced combining of the different repetitions for improved performance. Identifying such repetitions may be useful for efficient processing as noted herein.

In some embodiments, a subset of symbols from a current communication being received are compared to a corresponding subset of symbols in a previously-received communication, and this comparison is used to ascertain whether the current communication is a repetition of the previously-received communication. With this approach, repetitive communications can be detected without necessarily decoding the entire communication. This can be useful for reducing processing time and energy, as for example if a previous packet is decoded correctly (e.g., as indicated by a cyclic redundancy check (CRC)), repetitions of that packet may not need to be decoded. While not necessarily so limited, various aspects may be appreciated through the following discussion of non-limiting examples which use exemplary contexts.

In the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments are directed to recognizing repetitions in packet-based communications by comparing an incoming packet to a previous packet, based on symbols in each packet. For instance, a few orthogonal frequency-division multiplexing (OFDM) symbols from each packet may be compared. Such symbols may be taken at a point in the signal reception circuitry process prior to decoding, such as at an equalizer output, or at log-likelihood ratio (LLR) processing level. Using approaches such as these and others characterized herein, a receiver may identify whether an incoming packet is a new packet or if it belongs to a repetition series (as may also be referred to as a retransmission series). In this context, a new packet may be received from a transmitter ascertaining control of a channel, and a repetition packet may be received from the same transmitter. These approaches work for communications in which there may be no explicit flagging of a repetition, such as where L-STF (legacy short training field) and L-LTF (legacy long training field) section of a preamble are identical for all packets, legacy SIG (signal field) symbols do not contain information about being part of a repetition, and DATA symbols may also convey the same payload. Upper layers may filter out message duplicates in case more than one copy of the same retransmission series was decoded successfully.

In some embodiments, the content of a SIG symbol is first analyzed to quickly validate or discard a packet as not being part of the retransmission series. For instance, while some SIG symbols may match, or nearly match (e.g., as indicated via a resemblance metric), for different packets that are not part of a repetition series, detecting a mismatch in SIG symbols may be used as an indication that respective packets are not repetitions. Since the SIG symbol may be more immune to errors than data symbols and has its own error protection as parity bit, in many cases it can be reliably used. As such, if the SIG symbols do not match identically or exhibit a majority/threshold amount of data that matches, it can be determined that the respective packets are not part of a retransmission series.

In a further implementation, the above approach for comparing SIG symbols may be used as a first step, and those data packets having a matching SIG symbol are further evaluated to detect whether they are repetitive by assessing one or more symbols in the data field. For instance, a first DATA symbol(s) (or LDPC block(s)) can be assessed and compared to detect repetitions. In some instances, a resemblance metric denoted as EVM (error vector magnitude), can be detected and compared for respective packets. In other implementations, a SIG symbol is used together with one or more symbols in data payload to generate such a resemblance metric. This metric generation may be performed at an equalized constellation level or LLR level as noted above, or at other locations in receiver circuitry.

Various embodiments are directed to communications involving vehicles, such as automobiles, trains or boats, and other stations/devices may be implemented with a drone, a bicycle, a pedestrian and/or a traffic controller, may be in dynamic communication environments (e.g., in which some communications circuits are moving relative to one another) and include communications circuitry for wirelessly communicating with other stations using a communication protocol, sometimes herein referred to as vehicle-to-everything (V2X) communications. In such contexts, some exemplary implementations can utilize wireless communications in accordance with various standards, such as the IEEE 802.11-OCB standard, which may be referred to as IEEE 802.11p, or as otherwise specified in the IEEE 802.11-2016 specification, or newer protocols such as IEEE 802.11bd (sometimes denoted as new generation vehicle (NGV)), which is fully incorporated herein by reference (e.g., for implementation of communication protocols and approaches with FIGS. 1-2).

Various embodiments involve the use of standards such as IEEE 802.11bd, a 3GPP 4G LTE-V2X and/or 3GPP 5G NR standard. The standard features may improve overall system effectiveness, while remaining compatible with earlier devices, such as "legacy IEEE 802.11p" devices. As may be appreciated, legacy devices may include or refer to devices in the field that provide V2X using an older standard, such as IEEE 802.11p. Accordingly, various aspects herein are directed to facilitating communications such as repetitive communications, while maintaining compatibility for receiving communications using an older standard.

In a specific embodiment, the following approach is carried out to process incoming packets. If a previous packet has been decoded correctly (e.g., as indicated by a CRC pass), the current packet may be systematically decoded without any combining. While decoding the current packet when it is part of retransmission is not necessary, it is not necessary to decode it correctly since the previous one was correctly decoded. Therefore, the decision process based on a resemblance metric can be avoided (e.g., essentially force a comparison threshold to be exactly zero), and the decoded message can be checked to ensure that there is no mistakenly indicated repetition. Further, if the current packet is a new/different packet, it would need to be decoded anyway. If the previous packet has not been decoded correctly, a current packet detected as a repetition based on a resemblance metric, can be combined therewith. When evaluating a packet as being a possible repetition (e.g., when a previous packet has not been decoded correctly as noted above), the content of the SIG symbol may be used as noted above to quickly validate or discard a packet being part of the retransmission series. Packets having matching SIG symbols are further evaluated as possible repetitions, using a first DATA symbol (or set of symbols).

Data symbols may be compared in one of more of a variety of manners. In some implementations, a resemblance metric is implemented as an EVM metric characterizing previous and current packets is determined for a range of subcarriers i and symbols j as follows, using an equalizer output:

$$EVM = \sqrt{\frac{\sum_{j=0}^{N_{sym}} \sum_{i=0}^{N_{sub}} |Eq_{previous\ packet_{(i,j)}} - Eq_{current\ packet_{(i,j)}}|^2}{\sum_{j=0}^{N_{sym}} \sum_{i=0}^{N_{sub}} |Eq_{previous\ packet_{(i,j)}}|^2}}$$

The EVM may provide a measurement of the average delta between the equalizer output of the current packet and the equalizer output of the previous packet. Once the EVM measurement is computed, it is compared to a precomputed EVM_threshold, as follows:

if EVM<EVM_threshold, the incoming packet is considered as a repetition; and if EVM≥EVM_threshold, the incoming packet is considered as a new packet. The EVM_threshold may be derived empirically or theoretically. When empirically derived, the EVM_threshold can be precomputed based on simulation results. For instance, one may set thresholds depending on MCS, target signal-to-noise ratio (SNR), packet length and/or channel characteristics such as frequency offsets, measured SNR, and channel estimate. In some embodiments, a similar measurement is carried out at the LLR level, for example at the output of a demodulation-mapper.

$$EVM = \frac{1}{N_{sym} * N_{sub}} \sqrt{\sum_{j=0}^{N_{sym}} \sum_{i=0}^{N_{sub}} |LLR_{previous\ packet_{(i,j)}} - LLR_{current\ packet_{(i,j)}}|^2}$$

Referring to the formula 650 of the EVM utilizing an equalizer output above, the term num may be denoted the numerator under the square root, for one particular subcarrier, as follows:

$$num = |Eq_{previous\ packet_{(i,j)}} - Eq_{current\ packet_{(i,j)}}|^2$$

Where $S_{(i,j)}$ is the transmitted symbol and $N_{(i,j)}$ is the noise.

$$num = |S_{previous\ packet_{(i,j)}} + N_{previous\ packet_{(i,j)}} - S_{current\ packet_{(i,j)}} - N_{current\ packet_{(i,j)}}|^2$$

$$num = |(S_{previous\ packet_{(i,j)}} - S_{current\ packet_{(i,j)}}) + (N_{previous\ packet_{(i,j)}} - N_{current\ packet_{(i,j)}})|^2$$

The term denom can be denoted as the denominator under the square root, for one particular subcarrier, as follows:

$$denom = |Eq_{previous\ packet_{(i,j)}}|^2 = |S_{previous\ packet_{(i,j)}} + N_{previous\ packet_{(i,j)}}|^2,\ \text{and provides:}$$

$$EVM = \sqrt{\frac{\sum_{j=0}^{N_{sym}} \sum_{i=0}^{N_{sub}} num_{(i,j)}}{\sum_{j=0}^{N_{sym}} \sum_{i=0}^{N_{sub}} denom_{(i,j)}}}$$

The expected value E of EVM can be computed as follows:

$$E\{EVM\} = \sqrt{\frac{E\{num\}}{E\{denom\}}} = \frac{E\{num\}}{E\{denom\}}$$

If the previous packet is identical to the current packet, the term num simplifies to the noise components:

$$num = |(N_{previous\ packet_{(i,j)}} - N_{current\ packet_{(i,j)}})|^2$$

When noise is tending to Inf, the numerator $\sum_{j=0}^{N_{sym}}\sum_{i=0}^{N_{sub}} num_{(i,j)}$ tends to zero, while the denominator $\sum_{j=0}^{N_{sym}}\sum_{i=0}^{N_{sub}} denom_{(i,j)}$ tends to the average power of the constellation (for instance 1 in case of BPSK or QPSK). When noise is tending to −Inf, and assuming the noise values are independent, the term denom simplifies to only the noise component, and the expected value E can be:

$$E\{EVM\} = \sqrt{\frac{E\{num\}}{E\{denom\}}}$$

$$= \frac{E\left\{\sqrt{|(N_{previous\ packet_{(i,j)}} - N_{current\ packet_{(i,j)}})|^2}\right\}}{E\left\{\sqrt{|N_{previous\ packet_{(i,j)}}|^2}\right\}}$$

$$= \frac{E\left\{\sqrt{2|(N_{previous\ packet_{(i,j)}})|^2}\right\}}{E\left\{\sqrt{|N_{previous\ packet_{(i,j)}}|^2}\right\}}$$

$$= E\{\sqrt{2}\} * \frac{E\left\{\sqrt{|(N_{previous\ packet_{(i,j)}})|^2}\right\}}{E\left\{\sqrt{|N_{previous\ packet_{(i,j)}}|^2}\right\}}$$

$$= \sqrt{2}$$

If the previous packet is NOT identical to the current packet, the distribution of $(S_{previous\ packet_{(i,j)}} - S_{current\ packet_{(i,j)}})$ can be utilized.

Figure 6:
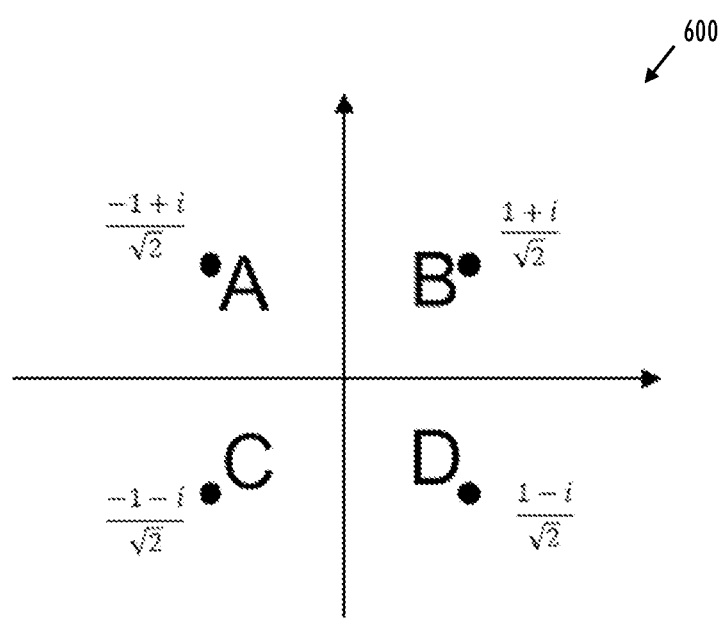
FIG. 6 depicts a diagram for quadrature phase-shift keying with four possible modulation points denoted as A, B, C and D, in accordance with the present disclosure.

The following further characteristic of the above distribution involves the modulation used to convey the signal. We use the QPSK modulation by way of example, which may be the most commonly used modulation for IEEE 802.11p messages, with the understanding that a similar approach can be carried out for other modulations. QPSK has 4 possible modulation points, which can be denoted A, B, C and D, and represented as shown in diagram 600 of FIG. 6.

When two randomly chosen points are subtracted, the following result values are possible (denoting X = $(S_{previous\ packet_{(i,j)}} - S_{current\ packet_{(i,j)}})$):

| case | Value of X | Value of $\sqrt{|X|^2}$ |
|---|---|---|
| A-A | 0 | 0 |
| A-B | $\frac{-2}{\sqrt{2}}$ | $\sqrt{2}$ |
| A-C | $\frac{2i}{\sqrt{2}}$ | $\sqrt{2}$ |
| A-D | $\frac{-2+2i}{\sqrt{2}}$ | 2 |

| case | Value of $X_1 \cdot X_2$ | Value of $|X_1 \cdot X_2|$ |
|---|---|---|
| A.A | i | 1 |
| A.B | −1 | 1 |
| A.C | 1 | 1 |
| A.D | −i | 1 |

Assuming all cases have equal chances, $E\{\sqrt{|X|^2}\} = \sqrt{2}$, and:

$$E\{EVM\} = \sqrt{\frac{E\{num\}}{E\{denom\}}}$$

$$= \frac{E\left\{\sqrt{|X + (N_{previous\ packet_{(i,j)}} - N_{current\ packet_{(i,j)}})|^2}\right\}}{E\left\{\sqrt{|S_{previous\ packet_{(i,j)}} + N_{previous\ packet_{(i,j)}}|^2}\right\}}$$

When noise is tending to −Inf, the same result as for the previous section is provided, as the term X is insignificant. When noise is tending to +Inf, we have:

$$E\{EVM\} = \sqrt{\frac{E\{num\}}{E\{denom\}}}$$

$$= \frac{E\left\{\sqrt{|X|^2}\right\}}{E\left\{\sqrt{|S_{previous\ packet_{(i,j)}}|^2}\right\}}$$

$$= \frac{\sqrt{2}}{1}$$

$$= \sqrt{2}$$

In this case, E{EVM} tends to f both for −Inf and +Inf.

For all cases, and as a generalization, And using property $|X-Y| = \sqrt{(X-Y)^2} = \sqrt{X^2 + Y^2 - 2XY}$, with $X = S_{previous\ packet_{(i,j)}} + N_{previous\ packet_{(i,j)}}$, $Y = S_{current\ packet_{(i,j)}} + N_{current\ packet_{(i,j)}}$, and assuming $E\{X^2\} = E\{Y^2\}$ since both the noise and symbols are independent and assuming $E\{2XY\}$, gives:

$$E\{EVM\} = \sqrt{\frac{E\{num\}}{E\{denom\}}}$$

$$= \frac{E\left\{\sqrt{\left(\sqrt{X^2+Y^2-2XY}\right)^2}\right\}}{E\left\{\sqrt{\left(\sqrt{X^2}\right)^2}\right\}}$$

$$= \frac{E\{(\sqrt{X^2+Y^2-2XY})\}}{E\{(\sqrt{X^2})\}}$$

$$= \frac{E\{(\sqrt{2*X^2})\}}{E\{(\sqrt{X^2})\}}$$

$$= \sqrt{2} * \frac{E\{(\sqrt{X^2})\}}{E\{(\sqrt{X^2})\}}$$

$$= \sqrt{2}$$

Accordingly, the following may be implemented for QPSK modulation:

in case of NO repetition, the expected value of the EVM is always √2, in case of repetition, the expected value of the EVM under low SNR is √2, and under high SNR it is 0, if the computed EVM is <√2, it's more likely to be a repetition, and if the computed EVM is >√2, it's more likely to be NOT a repetition. The confidence increases as the SNR increases.

For a given number of symbols, the area where the upper first percentile of the distribution of identical packets is below the lower first percentile of the distribution of different packets is a safe region where packets that are repetitions are readily identified from packets that are different. If the target SNR for such packets (for example for a transmit rate of 6 Mb/sec, for a 1000 bytes packet is known for each receiver, and the "recognition SNR" is before "10% PER SNR," the threshold (in EVM %) is set accordingly. For instance, the SNR for a new packet (initial transmission) may be set as SNR_newpacket=10% PER SNR=0.6 dB, and for a repetition packet may be set as SNR_repetition=10% PER SNR=−2.4 dB.

An empirical threshold may be selected such that less than 1% of repetition false detection, for any SNR>SNR_newpacket, and less than 1% of repetition missed detection, for any SNR>SNR_repetition. Accordingly, a threshold can be selected to achieve desirable operation. As such, an incoming packet is determined to be part of a retransmission series if the EVM is below the threshold, and as a new packet if the EVM is above the threshold.

In certain embodiments, packets as assessed as follows. The previous packet's CRC status is checked, and if it passed, the incoming message is decoded separately (without combining). If the CRC failed, the content of the SIG symbol is checked and compared to the previous message's SIG. If the SIG symbol content is different, the incoming message is decoded separately (without combining). If the SIG symbol content is similar, a comparison of a subset of symbols is used to determine whether the current packet is a repetitive packet as follows.

Decoding is initiated on symbols in the packet, over a subset of OFDM symbols (e.g., five symbols), and a comparison with the corresponding symbols in the previous packet is carried out to determine whether the packets are repetitive. The subset of symbols may be data symbols in a data payload, symbols in a preamble, or a combination of data payload symbols and preamble symbols (e.g., one SIG symbol and four DATA symbols). This comparison may involve a resemblance metric, and in particular, may utilize an EVM metric (such as characterized above) as follows. If the EVM metric is below the threshold, the incoming message is decoded with combining with the previous message. If the EVM metric is above the threshold, the incoming message is decoded separately (without combining). To facilitate this aspect, the previous packet's CRC and SIG status is stored, along with OFDM symbols to be used in the metric (e.g., equalized OFDM symbols), and the OFDM symbols of the incoming packet are buffered.

As may be implemented in accordance with a more specific embodiment, a method is carried out as follows. Wireless data transmissions including a current data message and a previous data message are received in succession. The data messages may be configured for asynchronous wireless reception and with respective data messages and with respective data symbols. A resemblance metric is generated to represent semblance between a subset the data symbols of the current data message and a subset the data symbols of the previous data message. The resemblance metric is used to determine whether the current data message is a repetition of the previous data message. The subsets of the data symbols may include, for example, a subset of data symbols in a preamble, in a payload, or in a combination of preamble and payload, of the current and previous data messages. In certain implementations, a cyclic redundancy check (CRC) status of the previous data message is checked, and the steps of generating the resemblance metric and determining whether the current data message is a repetition of the previous data message are carried out in response to the CRC status indicating that the previous data message was not decoded correctly.

The resemblance metric may be generated and/or utilized in a variety of manners. In some implementations, the resemblance metric is generated by comparing a subset of data payload symbols in the current data message with a corresponding subset of data payload symbols in the previous data message. If the resemblance metric indicates that a majority of the subset of symbols in the current data message match the subset of symbols in the previous data message, it is determined that the current data message is a repetition of the previous data message.

In certain implementations, the resemblance metric is generated based on subsets of symbols in the previous and current data messages, prior to decoding the subset of symbols in the current data message. For instance, the resemblance metric may be generated by initiating a decoding process for the subset of symbols in the current data message, and using the symbols at a stage in the decoding process that is prior to completing decoding of the subset of symbols, along with symbols of the previous data message at the corresponding stage of decoding.

Determining whether the current data message is a repetition of the previous data message may be carried out in a variety of manners. In some implementations, a symbol in a header of the current data message is compared with a corresponding symbol in the previous data message. The current data message is determined as not being a repetition of the previous data message in response to the symbol in the header of the current data message failing to match the corresponding symbol in the previous data message. In this implementation, determining the resemblance metric and determining whether the current data message is a repetition of the previous data message may be carried out in response to the symbol in the header of the current data message matching the corresponding symbol in the previous data message.

In a particular implementation, a cyclic redundancy check (CRC) status of the previous data message is checked and, in response, to the CRC status of the previous data message indicating that the previous data message was not decoded correctly, a symbol in a header of the current data message is compared with a corresponding symbol in the previous data message. If the compared header symbols match (or, e.g., are closely similar), the steps of generating the resemblance metric and determining whether the current data message is a repetition of the previous data message are carried out. In some instances, the entire current message is decoded in response to one of the CRC status indicating that the previous data message was decoded correctly, and/or the compared header symbols not matching.

Another embodiment is directed to an apparatus including a wireless communications receiver and a decoding circuit, which process messages via detection of repetitions. The wireless communications receiver receives current and previous data messages in succession. The decoding circuit generates a resemblance metric for the current and previous data messages, which represents semblance between a subset the data symbols of the current data message and a subset the data symbols of the previous data message. The decoding circuit determines whether the current data message is a repetition of the previous data message based on the resemblance metric.

The decoding circuit is implemented in a variety of manners, to suit particular embodiments. In some implementations, the decoding circuit generates the resemblance metric by comparing a subset of data payload symbols in the current data message with a corresponding subset of data payload symbols in the previous data message, and determines whether the current data message is a repetition of the previous data message in response to the resemblance metric indicating that a majority of the subset of symbols in the current data message match the subset of symbols in the previous data message.

In other implementations, the decoding circuit generates the resemblance metric based on subsets of symbols in the previous and current data messages, prior to decoding the subset of symbols in the current data message. A decoding process is initiated for the subset of symbols in the current data message, and the resemblance metric is generated using the symbols at a stage in the decoding process that is prior to completing decoding of the subset of symbols in the current message, and using the symbols of the previous data message at the corresponding stage in the decoding process.

In certain implementations, the decoding circuit is configured to compare a symbol in a header of the current data message with a corresponding symbol in the previous data message. If the symbol in the header of the current data message does not match the corresponding symbol in the header in the previous data message, the current data message is determined as not being a repetition of the previous data message, and the current data message is decoded. If the symbol in the header of the current data message matches the corresponding symbol in the previous data message, the resemblance metric is generated.

In other implementations, the decoding circuit checks a cyclic redundancy check (CRC) status of the previous data message and, when the CRC status of the previous data message indicates that the previous data message was not decoded correctly, compares a symbol in a header of the current data message with a corresponding symbol in the previous data message. If the compared header symbols match (or, e.g., if the headers closely or nearly match), the resemblance metric is generated and used to determine whether the current data message is a repetition of the previous data message.

Turning now to the figures, FIG. 1 illustrates an example wireless communications system and approach involving the communication of data messages in which some messages are repetitive. A plurality of vehicles 102-106 as well as miscellaneous vehicles/devices 107-N are shown, some or all of which may participate in communications, and one or more of which include communication circuitry that communicates using repetitive communications in accordance with one or more embodiments as characterized herein. In the context of various embodiments, the vehicles and/or miscellaneous vehicles/devices may include automobiles, trains, boats, bicycle and/or pedestrian devices (e.g., mobile telephones or wearables), or non-mobile devices such as may be implemented with road side units or traffic controllers (e.g., stoplights, gates, bridges, and train crossings). Each such vehicle/device can include a station that effects communications as characterized herein.

In a particular embodiment, vehicle 102 communicates with vehicles operating using different protocols, including vehicle 104 operating with a (first) legacy communication protocol and vehicle 105 operating with a (second) NGV communication protocol. Vehicle 102 may also operate in more populated environments involving one of more of vehicles 103 and/or 106 and miscellaneous vehicles/devices 108-N. Receiver circuitry in vehicle 102 collects information wirelessly respectively from transmissions associated with the legacy communication protocol (at least from vehicle 104) and from transmissions associated with another communication protocol (at least from vehicle 105), which may be over a particular wireless communications channel. Other transmissions according to the legacy communication protocol may be received from vehicle 103 or one or more of miscellaneous vehicle/devices 107-N. Further transmissions according to the other (e.g., NGV or 3GPP 5G NR) communication protocol may be received from vehicle 106 or one or more of miscellaneous vehicles/devices 107-N, some or all of which may also communicate via the legacy communication protocol.

The receiver circuitry in vehicle 102 assesses received communications to ascertain whether the communications are repetitive, in a manner consistent with one or more embodiments herein. A subset of data symbols in current and previous data messages can be compared, and the comparison can be used to determine a likelihood of the current data message is a repetition. For instance, referring to a new transmission from the legacy device at vehicle 104 (or as may also be received from an NGV device at vehicle 105) having a preamble 130 and payload 131, symbols in the payload 131 may be compared to symbols in payload 121 of a previous message having preamble 120. When these messages are different, the comparison of the symbols indicates such, in response to which the receiver circuitry in vehicle 102 decodes the entire payload 131.

Referring to a repetition transmission from NGV device at vehicle 105 (or as may otherwise be received from other devices) having a preamble 110A and payload 111A that correspond to the preamble 110 and payload 111 of a previous message, symbols in the payload 111A may be compared with symbols in payload 111 to detect whether the current message is a repetition from a previous message. For instance, a resemblance metric can be calculated with the symbols from payload 111A and payload 111, which should meet a threshold level of semblance to indicate that the current message is a repetition. In other implementations, symbols in the preamble 110A may be compared with symbols in preamble 110, or a resemblance metric may be calculated using the preamble symbols, in a similar manner. Further implementations involve using symbols in both preamble and payload sections of the messages for comparison and/or metric generation. Accordingly, the messages can be combined to facilitate accurate decoding when, for example, the payload 111 may not have been completely decoded correctly.

In certain embodiments, the receiver circuitry in NGV device 102 processes incoming data messages as follows. The previous message's CRC status is checked, and if it passed, the current message is decoded without combining. In this context, if the current message is a new message, it would need to be completely decoded, and if the current message is a repetition, decoding the repetition will confirm the repetitive nature and the message may discarded. If the CRC fails, the content of the SIG symbol in the current packet is checked and compared to the previous message's SIG symbol. If the SIG symbol content is different, the current message is decoded separately without combining, as such a difference may indicate that the current message is new. If the SIG symbol content is similar, a comparison of a subset of symbols is used to determine whether the current message is a repetitive message as follows.

Decoding is initiated on a subset of data payload symbols in the current message, the subset of data payload symbols are compared or otherwise used with corresponding symbols in the previous packet at a stage in the decoding process (e.g., at an equalizer output). This comparison may involve a resemblance metric, and in particular, may utilize an EVM metric as characterized above.

The wireless communications depicted in FIG. 1 may involve V2X communications, which may include multiple types of communications such as: vehicle-to-vehicle (V2V), vehicle-to-infrastructure (V2I), vehicle-to-network, (V2N) and vehicle-to-pedestrian (V2P). In specific instances, a V2X network may enable an exchange of information between a plurality of vehicles and, in some instances, other devices. As may be appreciated, as used herein "circuitry" refers to one or more circuits, such as a plurality of similarly-operating (or version of) circuits operating in respective vehicles, one or more of which may involve programmable devices utilizing software. The vehicles can communicate messages to one another, such as speed measurements, communication measurements, GPS data, etc., via the vehicular communications circuits.

The communication protocol technologies characterized herein, including legacy and other/NGV technologies, may be IEEE 802.11-based technology, such as IEEE 802.11p or other Wi-Fi technology. Referring to FIG. 1, each of the newer standard and older standard devices/vehicles may thus be implemented with communications circuitry that wirelessly communicates using a communications protocol that is consistent with Wi-Fi or IEEE 802.11p-based communications. The communications protocols used may involve sending messages asynchronously. For example, communications circuitry can observe (e.g., listen) the channel and communicate in response to the channel being clear (e.g., no messages being transmitted).

Figure 2:
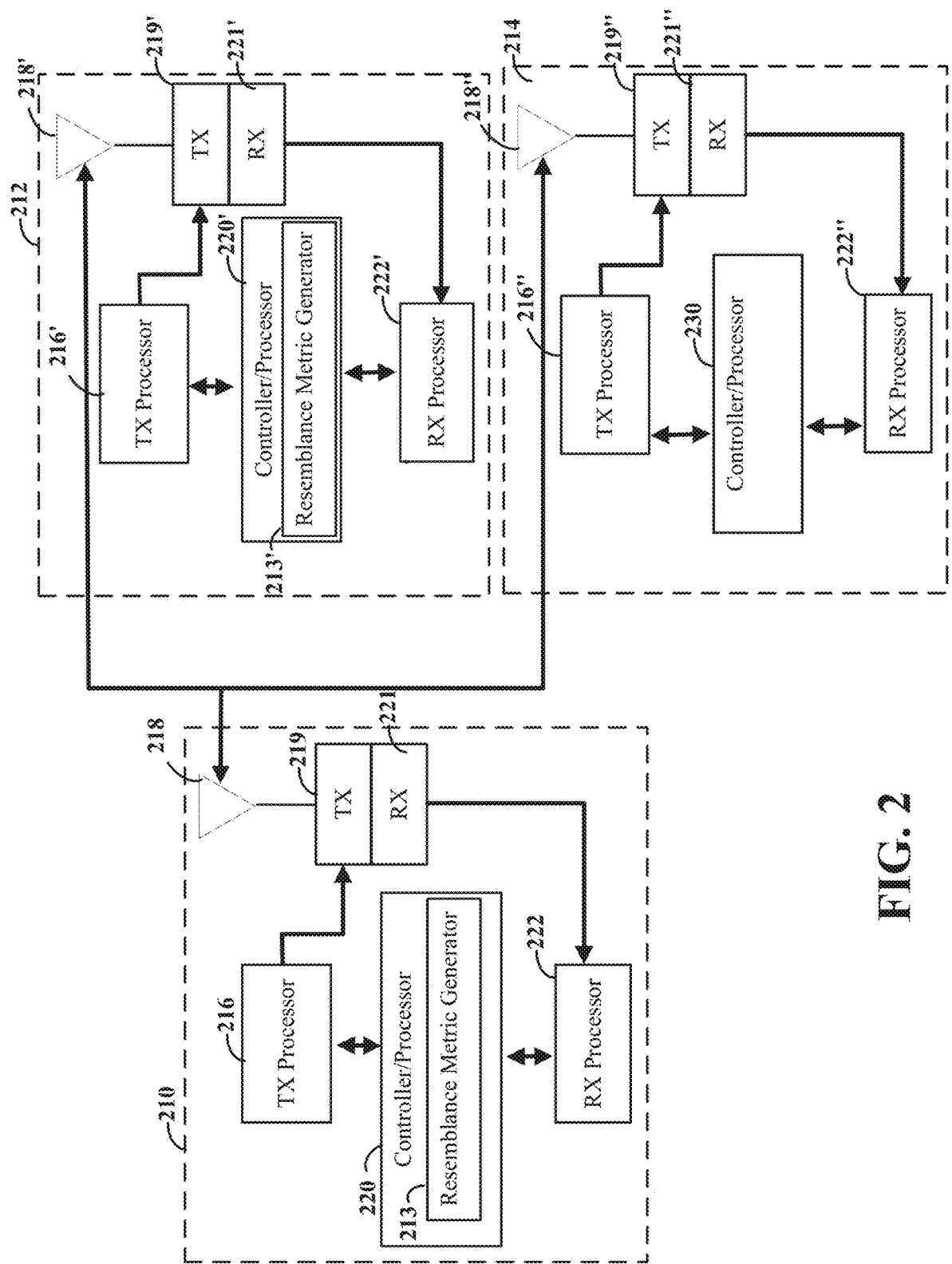
FIG. 2 illustrates example communications circuitry of a plurality of stations, in accordance with the present disclosure.

FIG. 2 illustrates example communications circuits of respective stations, in accordance with various embodiments. Each of communications circuits 210, 212 and 214 can communicate wirelessly in a wireless communications network using a communications protocol. FIG. 2 illustrates first communications circuit 210 and second communications circuit 212 that operate according to a first (e.g., newer/other) communication type (e.g., standard) and third communications circuitry 214 that operates according to a second (e.g., older/legacy) communication type. Referring by way of example to FIG. 1, circuit 210 may be implemented with vehicle 102, circuit 212 may be implemented with vehicle 105, and circuit 214 may be implemented with vehicle 104.

The communications circuits 210, 212, 214 include certain common circuitry types as may be implemented similarly. The first communications circuit 210 includes a transmit (TX) processor 216 and receive (RX) processor 222 used with a controller/processor 220 to implement various functionality for transmitting and receiving messages in accordance with both legacy and newer/other communication protocols. The first communications circuitry 210 also includes transmitter 219, receiver 221, and antenna 218.

The communications circuits 212 and 214 also include similar components, with corresponding notations used (e.g., 218' and 218" denoting antennas as well). For communications circuits 210 and 212, the controller/processor 220 and controller/processor 226 also include resemblance metric generators 213 and 228 that generate a resemblance metric as characterized with one or more embodiments herein. The communications circuit 214 is shown with controller/processor 230 operable to transmit and receive (and decode) signals in accordance with a second protocol. As such, first communications circuit 210 and second communications circuit 212 are backwards compatible for receiving communications from (and as may also be used for sending certain communications to) third communications circuitry 214.

Each of the first, second, and third communications circuitries 210, 212, 214 may communicate wirelessly using a communications protocol in which messages are sent asynchronously and over the same channel. The messages can each have a preamble that includes a legacy short training field (L-STF) that provides support of synchronization and automatic gain control (AGC) calibration (e.g., which can be 8 μsec), a legacy long training field (L-LTF) that provides channel estimation pilot for decoding subsequent Wi-Fi-based symbols (e.g., which can be 16 μsec), and a signal field (SIG) symbol that conveys the MCS (e.g., which can be 8 μsec).

Accordingly, communications circuit may assess messages received via its antenna 218, receiver 221 and receive processor 222, implementing its controller processor 220 and resemblance metric generator 213 to generate a resemblance metric based on a subset of symbols in messages received from circuits 212 and 214 (and others). For instance, when either circuit 212 or 214 ascertains control of a channel and sends a new message, the new message may be detected by comparing data in a preamble SIG field. For new messages that have the same SIG field, symbols in the respective payloads may be compared, prior to decoding the entire message, to determine whether the messages are repetitions, and processed accordingly.

As may be appreciated, communications (and as may be applicable, communication networks) are not limited to the number of stations and/or communications circuitries as illustrated by FIGS. 1 and 2. Various embodiments can include greater or fewer stations having communications circuitries in a shared device geography, and additional or fewer types of stations having communications circuitries (e.g., mobile phones). The number of stations can also change over time due to movement of vehicles or other stations and/or additional stations entering the shared station geography (e.g., forming ad-hoc network(s)).

Figure 3:
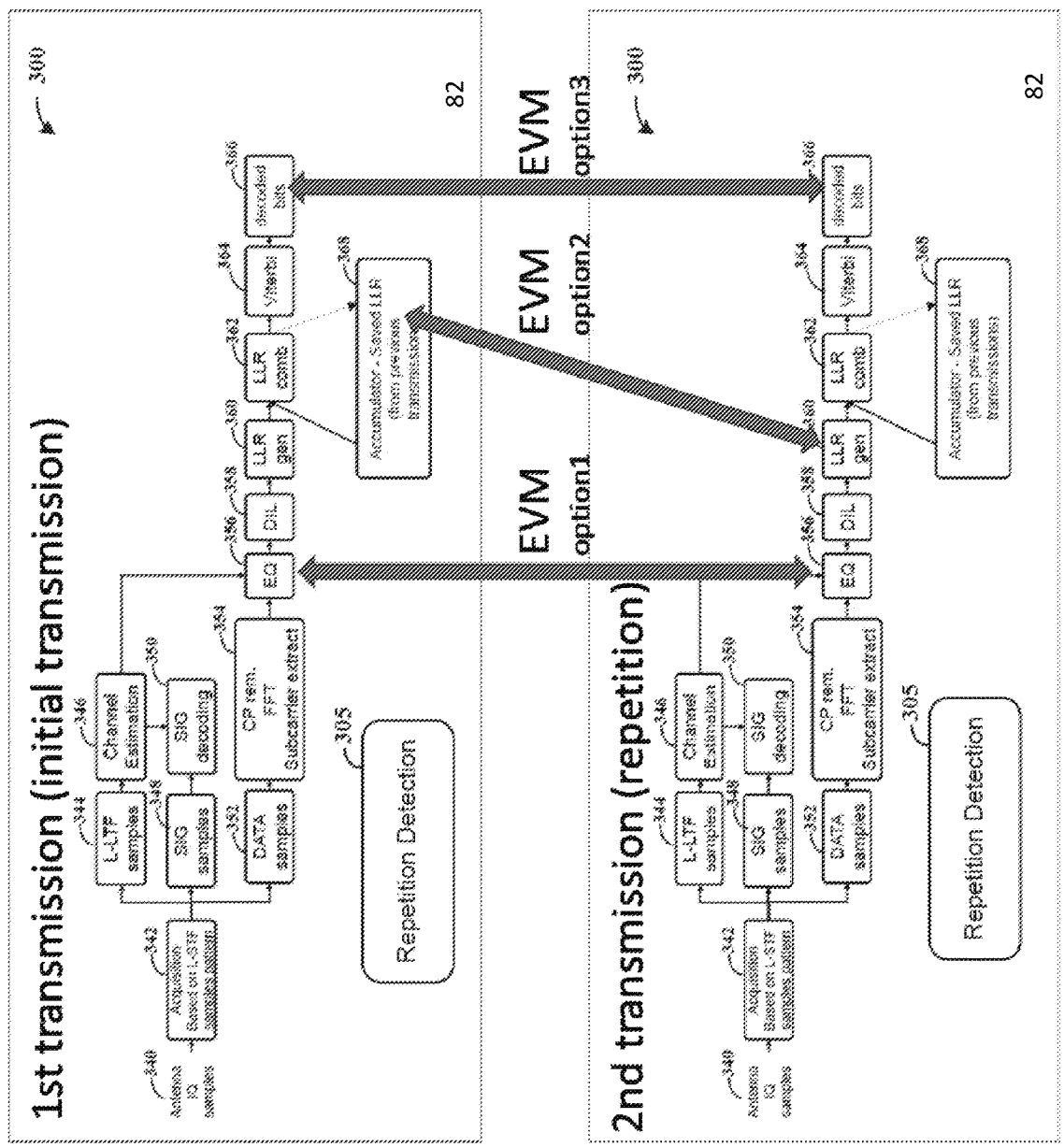
FIG. 3 depicts an apparatus with related processing of received transmissions, in accordance with the present disclosure.

FIG. 3 depicts an apparatus 300 with related processing of subsequently received transmissions, in accordance with the present disclosure. The upper portion of FIG. 3 shows receipt of a first or initial transmission, and the lower portion of FIG. 3 shows receipt of a repetition. The apparatus 300 operates as a receiver with various blocks as indicated to carry out respective functions. In this context, block 342 carries out acquisition based on L-STF samples from antenna IA samples received at 340. Block 344 utilizes L-LTF samples and feeds channel estimation block 346. Block 348 utilizes SIG samples and feeds SIG decoding block 350, which is also fed by channel estimation block 346. Block 352 utilizes data samples and feeds FFT (fast Fourier Transform) subcarrier extraction block 354. An equalizer 356 is fed by the subcarrier extraction block 354 and receives information from the channel estimation block 346 as may be used in equalization. Remaining blocks include de-interleaving (DIL) 358, LLR (log likelihood ratio) generation 360, LLR combination 362, Viterbi decoding 364 and, finally, an output of decoded bits at 366. An accumulator block 368 may save the LLR from a previous transmission, to provide to LLR block 362. One or more blocks as shown may be omitted, or other blocks may be implemented, in different receivers/decoders as may be implemented with various embodiments.

By way of example, resemblance metrics may be generated by a repetition detection block 305, using symbols as shown in the first transmission in the upper portion of FIG. 3, and symbols in the second transmission in the lower portion of FIG. 3. Specifically a first option may involve comparing a subset of symbols output from equalizer 356, output at the LLR soft-decision sequence generation in the second transmission (and, e.g., the same as stored in accumulator 368 from the initial transmission), or in the hard-decision sequence bits out of the Viterbi decoder 366.

In some implementations, the resemblance metric is generated based on statistics or a signature from the Viterbi decoding block 364, such as a path metric distribution after some defined time, which can be compared (correlated) for the first (previous) and second (new) transmission.

Figure 4:
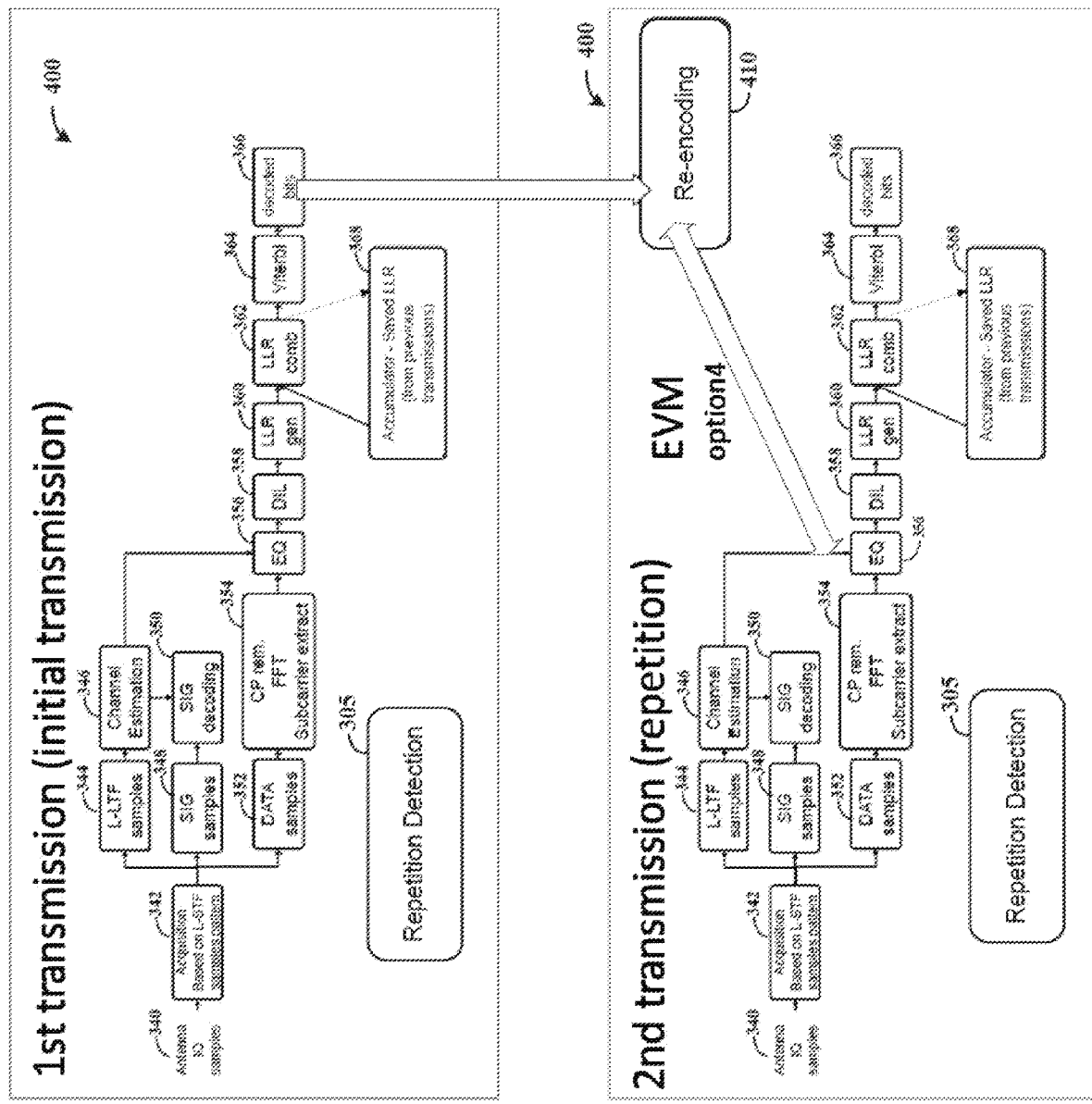
FIG. 4 depicts an apparatus with related processing of received transmissions, in accordance with the present disclosure.

FIG. 4 depicts an apparatus 400 with related processing of received transmissions involving re-encoding, in accordance with the present disclosure. The blocks shown in FIG. 4 are labeled similarly to those in FIG. 3 and may be implemented in a common manner with an initial (or previous) communication depicted in the upper portion of FIG. 4 and a second (current) communication depicted in the lower portion thereof. As such, further discussion of those similarly labeled blocks is omitted for brevity. The apparatus 400 also includes a re-encoding block 410 that re-encodes a subset of the decoded bits at 366 from the initial transmission. The re-encoding may include, for example, convolution-encoding, modulation mapping, interleaving, and IFFT (invers fast Fourier Transform) operations. The repetition detection block 305 uses the re-encoded subset from the first transmission, along with a corresponding subset of symbols in the second transmission, to determine whether the second transmission is a repetition. In this context, data pertaining to a previous transmission can be retained for use in determining whether the second transmission is a repetition, in a compact manner.

Figure 5:
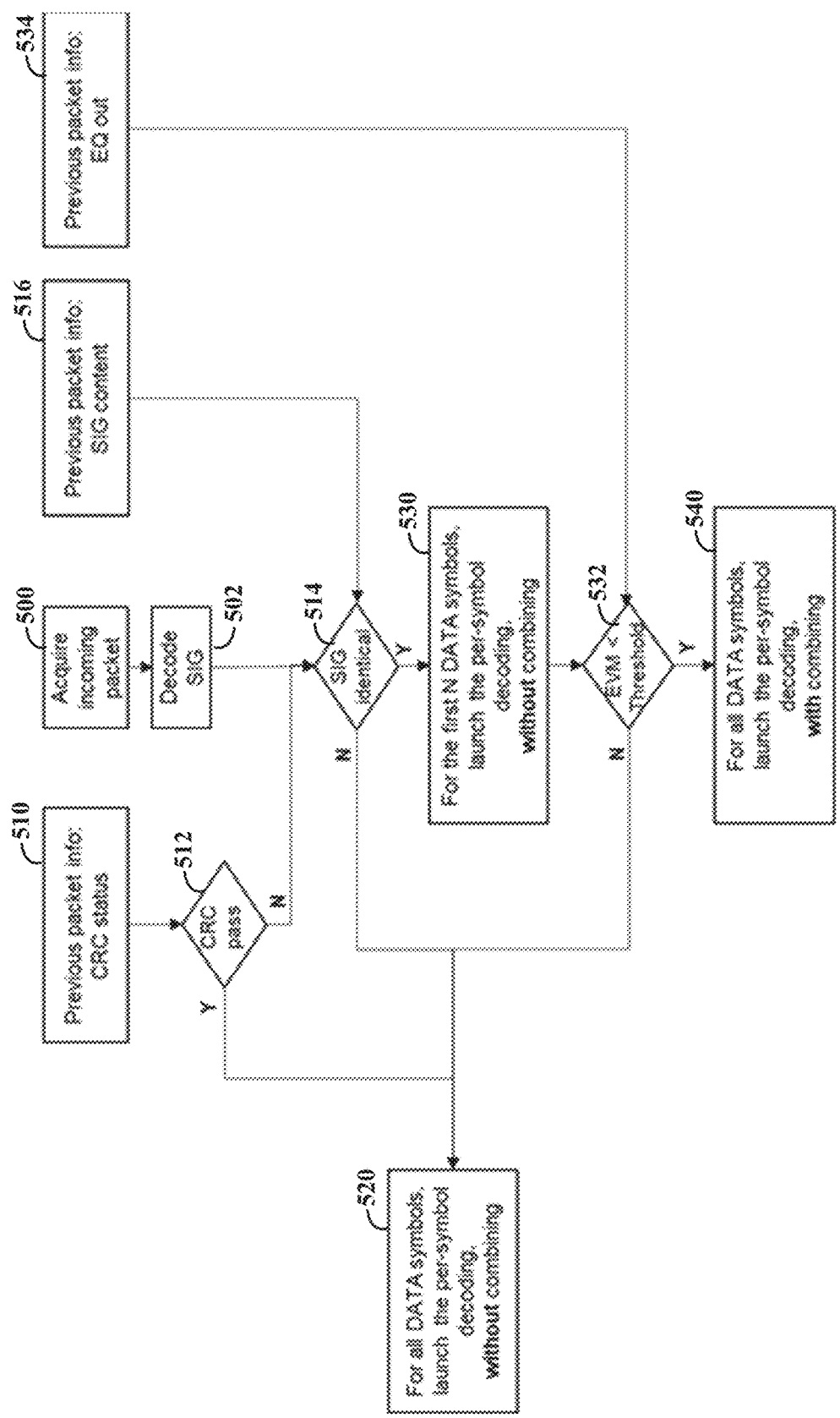
FIG. 5 depicts a data flow diagram for processing of received transmissions, in accordance with the present disclosure.

FIG. 5 depicts a data flow diagram for processing of received transmissions, including a current packet and a previous packet, in accordance with the present disclosure. At block 500, an incoming (current) packet is acquired and its SIG field is decoded at block 502. The CRC status of the previous packet is checked at block 510 and, if the CRC is determined to have passed at 512, per-symbol decoding is launched at block 520, without combining the current and previous packets. If the CRC did not pass, the SIG field of the current packet is compared at 514 with the SIG field of the previous packet (516). If the SIG fields are not identical (or do not sufficiently match), per-symbol decoding is launched at block 520, without combining the current and previous packets.

If the SIG fields are identical, or sufficiently matching, at 514, a process is initiated for ascertaining whether the current packet is a repetition. At block 530, per-symbol decoding is launched for a subset of symbols in the current packet (e.g., without combining with corresponding symbols in the previous packet), and a resemblance metric referred to as EVM is generated, using corresponding symbols 534 from the previous packet (e.g., at the output of an equalizer). If the EVM is less than a threshold at 532 indicating that the current packet is not a repetition, per-symbol decoding is launched at block 520, without combining the current and previous packets. If the EVM is not less than the threshold at 532, per-symbol decoding is launched at block 540 using combining with corresponding symbols in the previous packet.

Aspects of the present disclosure are directed to use with communications that may involve repetitive communications. As may be implemented in accordance with one or more embodiments, a subset of symbols in a current data message are used with a corresponding subset of symbols in a previous data message, to ascertain whether the current data message is a repetition of the previous data message. This may involve, for instance, generating a resemblance metric to represent semblance between a subset the data symbols of the current data message and a subset the data symbols of the previous data message. The resemblance metric can be used in determining whether the current data message is a repetition of the previous data message. This approach may be useful, for example, in ascertaining whether the current message is a repetition without necessarily decoding the message.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, receiver, decoding circuit, CRC check, and/or other circuit-type depictions (e.g., reference numerals 210, 220, 222 and 216 of FIG. 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 3-5. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described with FIG. 5 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit" "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, different numbers of symbols may be decoded for generating a resemblance metric or for otherwise being used in a comparison. As another example, symbols may be compared at different stages in a decoding or receiving process. Such modifications do not depart from the true spirit and scope of various aspects of the disclosure, including aspects set forth in the claims

What is claimed is:

1. A method comprising:
receiving, via communications circuitry, a wireless data transmission comprising at least a current data message and a previous data message received in succession wherein:
the wireless data transmission is configured, according to a communications protocol, for asynchronous wireless reception,
the current data message comprises a set of current data symbols, and
the previous data message comprises a set of previous data symbols; and
checking a cyclic redundancy check (CRC) status of the previous data message;
in response to the CRC status of the previous data message indicating that the previous data message was not decoded correctly, comparing a symbol in a header of the current data message with a corresponding symbol in a header of the previous data message; and
in response to a match between the compared header symbols, generating a resemblance metric indicative of semblance between a subset of the current data symbols and a corresponding subset of the previous data symbols, wherein the resemblance metric is implemented as an error vector magnitude metric; and
determining whether the current data message is a repetition of the previous data message based at least in part on the resemblance metric.

2. The method of claim 1, wherein
generating the resemblance metric comprises comparing the subset of the current data symbols with the corresponding subset of the previous data symbols; and
determining whether the current data message is the repetition comprises determining that the current data message is the repetition in response to the resemblance metric satisfying a threshold semblance criterion.

3. The method of claim 1, wherein generating the resemblance metric is performed prior to decoding the subset of the current data symbols.

4. The method of claim 3, wherein generating the resemblance metric prior to decoding the subset of the current data symbols comprises:
initiating a decoding process for the subset of the current data symbols; and
generating, at an intermediate stage of the decoding process, the resemblance metric based on a partially-decoded subset of the current data symbols and a partially-decoded subset of the previous data symbols, wherein the partially-decoded subset of the current data symbols and the partially-decoded subset of the previous data symbols correspond to a same stage of the decoding process.

5. The method of claim 1, wherein determining whether the current data message is a repetition comprises:
comparing a symbol in a header of the current data message with a corresponding symbol in a header of the previous data message; and
determining that the current data message is not a repetition in response to the symbol in the header of the current data message failing to match the corresponding symbol in the header of the previous data message.

6. The method of claim 5, wherein the steps of generating the resemblance metric and determining whether the current data message is a repetition are performed in response to the symbol in the header of the current data message matching the corresponding symbol in the header of the previous data message.

7. The method of claim 1, wherein the subsets each comprise a subset of data symbols in a preamble, in a payload, or in a combination of preamble and payload, of the current and previous data messages, respectively.

8. The method of claim 1, further comprising decoding the current data message in response to one of:
the CRC status indicating that the previous data message was decoded correctly; and
the compared header symbols not matching.

9. An apparatus comprising:
a wireless communications receiver configured to receive a wireless data transmission comprising at least a current data message and a previous data message received in succession, wherein:
the wireless data transmission is configured according to a communications protocol, for asynchronous wireless reception,
the current data message comprises a set of current data symbols, and
the previous data message comprises a set of previous data symbols; and
a decoding circuit configured to:
check a cyclic redundancy check (CRC) status of the previous data message; in response to the CRC status of the previous data message indicating that the previous data message was not decoded correctly, compare a symbol in a header of the current data message with a corresponding symbol in a header of the previous data message;
in response to a match between the compared header symbols, generate a resemblance metric indicative of semblance between a subset of the current data symbols and a corresponding subset gf the previous data symbols, wherein the resemblance metric is implemented as an error vector magnitude metric; and determine whether the current data message is a repetition of the previous data message based at least in part on the resemblance metric.

10. The apparatus of claim 9, wherein the decoding circuit is configured to:

generate the resemblance metric by comparing the subset of the current data symbols with the corresponding subset of the previous data symbols; and determine that the current data message is the repetition in response to the resemblance metric satisfying a threshold semblance criterion.

11. The apparatus of claim 9, wherein the decoding circuit is configured to generate the resemblance metric prior to decoding the subset of the current data symbols, by:

initiating a decoding process for the subset of the current data symbols; and generating, at an intermediate stage of the decoding process, the resemblance metric based on a partially-decoded subset of the current data symbols and a partially-decoded subset of the previous data symbols, wherein the partially-decoded subset of the current data symbols and the partially-decoded subset of the previous data symbols correspond to a same stage of the decoding process.

12. The apparatus of claim 9, wherein the decoding circuit is further configured to:

determine that the current data message is not a repetition in response to the symbol in the header of the current data message not matching the corresponding symbol in the header in the previous data message;

decode the current data message in response to the determination that the current data message is not a repetition; and generate the resemblance metric in response to the symbol in the header of the current data message matching the corresponding symbol in the header of the previous data message.

13. A method comprising: receiving current and previous data packets over a wireless asynchronous communications channel;

checking a cyclic redundancy check (CRC) status of the previous data packet;

in response to the CRC status of the previous data message indicating that the previous data message was not decoded correctly, comparing a symbol in a header of the current data packet with a corresponding symbol in a header of the previous data packet; and in response to a match between the compared header symbols, generating a resemblance metric based on a subset of symbols in the current data packet and a corresponding subset of symbols in the previous data packet, wherein the resemblance metric indicative of semblance between the subsets of symbols in the current and previous data packets and is implemented as an error vector magnitude metric; and determining whether the current data packet is a repetition of the previous data packet based at least in part on the resemblance metric.

14. The method of claim 13, wherein the subsets of symbols in the current and previous data packet include one or both of data payload symbols and packet preamble symbols.

15. The method of claim 13, further comprising, in response to a determination that the current data packet is a repetition, decoding the current data packet and combining data from the current data packet and the previous data packet.

16. The method of claim 1, wherein the error vector magnitude represents an average difference between an equalizer output for the subset of the current data symbols and an equalizer output for the subset of the previous data symbols.

* * * * *